J. Allender,
Wringer.
No. 1,709. Reissued June 28, 1864.
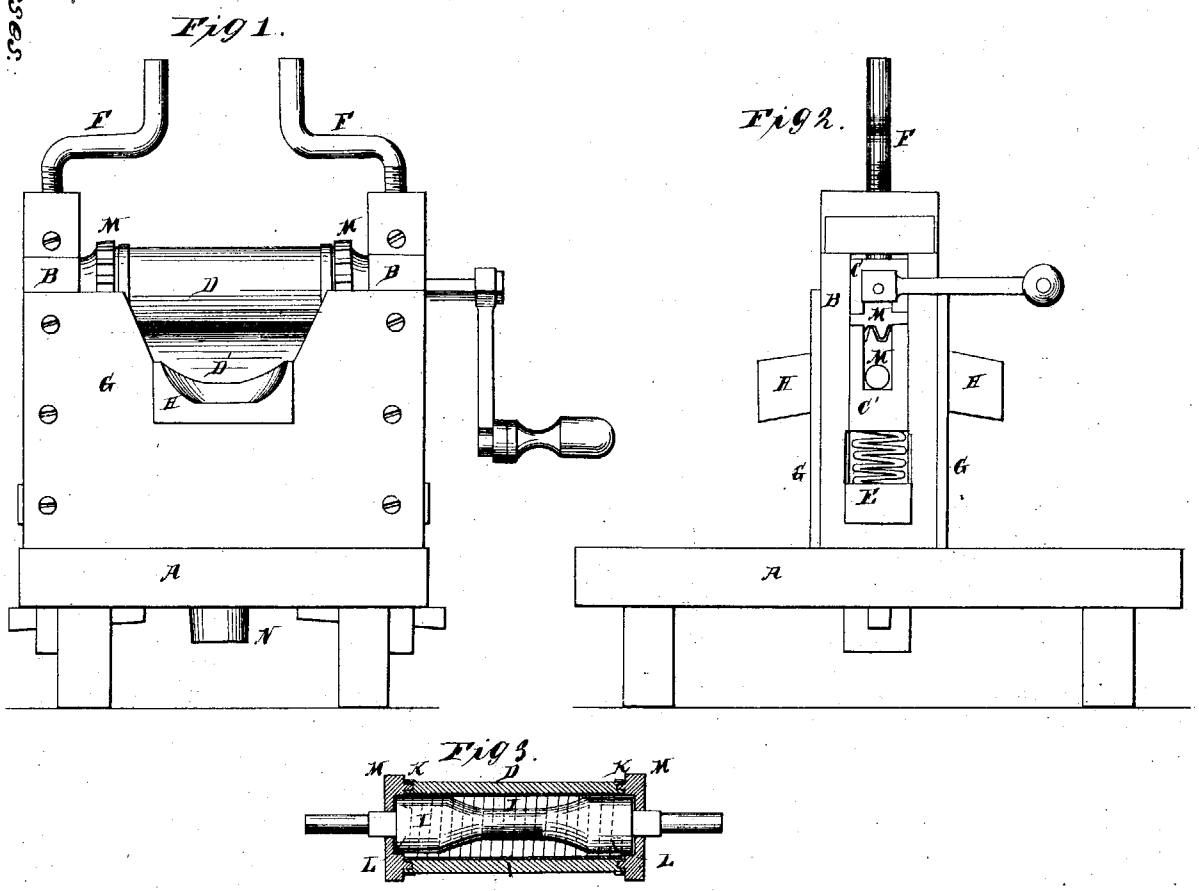
Witnesses:
John Grace
John R. Rutsellow
Inventor
John Allender
N. PETERS, PHOTO-LITHOGRAPHER, WASHINGTON, D. C.

UNITED STATES PATENT OFFICE.

SELDEN A. BAILEY, SIMEON S. COOK, AND BENEDICT M. COOK, OF WOONSOCKET, R. I., ASSIGNEES, BY MESNE ASSIGNMENTS, OF JOHN ALLENDER.

IMPROVED ROLLERS FOR EXPRESSING WATER FROM CLOTHES.

Specification forming part of Letters Patent No. 22,539, dated January 11, 1859; Reissue No. 1,709, dated June 28, 1864.

*To all whom it may concern:*

Be it known that JOHN ALLENDER, of the city and county of New London, and State of Connecticut, did invent a new and useful roller for squeezing the water, dyeing-liquor, &c., from cloth, clothes, &c.; and we do hereby declare that the same is described and represented in the following specifications and drawings.

To enable others skilled in the art to make and use said invention, we will proceed to describe its construction and use, referring to the drawings, in which the same letters indicate like parts in each of the figures.

Figure 1 is a front elevation of a pair of squeezers with said new rollers. Fig. 2 is a side elevation of the same. Fig. 3 is a section of said new roller.

The nature of said invention consists in a roller made of a spirally-coiled spring, arranged on a shaft or roller made smallest in the middle to allow the spring to yield, which spring is covered with india-rubber or some flexible material that will yield or bend readily to the cloth, clothes, or other articles being squeezed by the rollers.

In the accompanying drawings, A is the base of the frame of the squeezing-rollers, to which the standards B B are fastened. In each of these standards there is a long slot, in which the boxes C of the top roller D and the boxes C of the bottom roller D are fitted to traverse, the boxes C being pressed upward by the spiral spring E, placed between the bottom of the slot and the box, as shown in Fig. 2. The screws F F act against the top boxes C to press the rollers together and press them down and press the boxes C against the springs E to produce the required pressure between the rollers for the cloth or clothes to be squeezed. The standards B B are boarded up on each side of the rollers, as shown in Fig. 1 at G, and a guide, H, is fastened to the boarding G to guide the cloth or clothes between the rollers.

The rollers D D consist of a shaft or central roller, I, made smaller in the middle, as shown in Fig. 3. This shaft is surrounded by a flat metal spring, coiled spirally so as to form a cylinder, J, of a uniform diameter from end to end, around the roller or shaft I and fitting it at each end, as shown in section Fig. 3. Around this spring-cylinder J there is a cylindrical covering, D, made of india-rubber or some flexible material, that will yield or bend readily as the spring-cylinder inside of it yields to the pressure of the cloth or clothes passing between the rollers. This india-rubber covering is surrounded with a thin hoop, K, at each end, and is pierced by several spurs L L on the gears M M, which are firmly fastened to the shaft I to make both the rollers turn together as the cloth or clothes being squeezed pass between them, and the water squeezed from the cloth runs from the under roller between the boards G G onto the base A and through the spout N away from the machine. The central roller, I, being made smaller in the middle, allows the coiled-spring cylinder to yield to the varying thickness of cloth or clothes passing between the rollers.

We believe we have described and represented the yielding roller which said ALLENDER invented so as to enable any person skilled in the art to make and use it.

What we claim as new in said invention, and desire to secure by Letters Patent, is—

1. A roller so constructed as to yield more at its center than at or near its ends, in combination with a covering of vulcanized rubber of tubular form, as and for the purpose set forth.

2. Cog-wheels, in combination with elastic rollers, constructed and used substantially as set forth.

S. A. BAILEY,
SIMEON S. COOK,
BENEDICT M. COOK,
*Assignees of John Allender, patentee.*

Witnesses:
H. J. RAMSDELL,
D. E. SOMES.